United States Patent
Waters et al.

(10) Patent No.: US 9,811,136 B2
(45) Date of Patent: *Nov. 7, 2017

(54) CHARGING A PROVIDER/CONSUMER WITH A DEAD BATTERY VIA USB POWER DELIVERY

(71) Applicant: TEXAS INSTRUMENTS INCORPORATED, Dallas, TX (US)

(72) Inventors: Deric W. Waters, Dallas, TX (US); Srinath Hosur, Plano, TX (US); Anand Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,001

(22) Filed: Mar. 7, 2016

(65) Prior Publication Data

US 2016/0239063 A1 Aug. 18, 2016

Related U.S. Application Data

(63) Continuation of application No. 13/862,620, filed on Apr. 15, 2013, now Pat. No. 9,310,868.

(60) Provisional application No. 61/624,760, filed on Apr. 16, 2012, provisional application No. 61/624,779, filed on Apr. 16, 2012, provisional application No. 61/642,953, filed on May 4, 2012, provisional application No. 61/652,001, filed on May 25, 2012, provisional application No. 61/660,476, filed on Jun. 15, 2012.

(51) Int. Cl.
G06F 1/00 (2006.01)
G06F 1/26 (2006.01)
G06F 1/32 (2006.01)

(52) U.S. Cl.
CPC .............. *G06F 1/266* (2013.01); *G06F 1/263* (2013.01); *G06F 1/32* (2013.01)

(58) Field of Classification Search
CPC .................................... G06F 1/26; G06F 1/32
See application file for complete search history.

(56) References Cited

U.S. PATENT DOCUMENTS

| 2005/0039060 A1 | 2/2005 | Okayasu |
| 2006/0076977 A1 | 4/2006 | Zhu |
| 2007/0075692 A1* | 4/2007 | Ostrom ................... G05F 1/618 323/274 |

(Continued)

*Primary Examiner* — Phil Nguyen
(74) *Attorney, Agent, or Firm* — John R. Pressetto; Charles A. Brill; Frank D. Cimino

(57) ABSTRACT

A VBUS conductor is checked to determine whether a voltage on the VBUS conductor is greater than a vSafe0V voltage within a detect time interval. A device policy manager applies a vSafeDB voltage to the VBUS conductor when the voltage on the VBUS conductor is greater than the vSafe0V voltage. The policy engine waits for a bit stream to be detected within a timer interval. When the bit stream is not detected within the timer interval, the device policy manager is instructed to apply the vSafe0V voltage to the VBUS conductor. The device policy manager applies a vSafe5V voltage to the VBUS conductor when the bit stream is detected, and the policy engine waits for the bit stream to stop within a device ready timer interval. When the bit stream has stopped within the device ready timer interval, the policy engine sends capabilities as a source port.

8 Claims, 10 Drawing Sheets

(56) References Cited

U.S. PATENT DOCUMENTS

| | | | |
|---|---|---|---|
| 2008/0111522 A1* | 5/2008 | Simpson | H01M 10/44 |
| | | | 320/162 |
| 2008/0178011 A1 | 7/2008 | Hubo | |
| 2009/0108677 A1 | 4/2009 | Walter | |
| 2009/0174366 A1 | 7/2009 | Ahmad | |
| 2009/0198841 A1 | 8/2009 | Yoshida | |
| 2010/0052620 A1* | 3/2010 | Wong | H02J 7/0055 |
| | | | 320/137 |
| 2010/0090644 A1 | 4/2010 | Nokkonen | |
| 2011/0208980 A1* | 8/2011 | Brooks | G06F 1/266 |
| | | | 713/300 |
| 2014/0075212 A1* | 3/2014 | Urbina | G06F 1/26 |
| | | | 713/300 |
| 2015/0046622 A1* | 2/2015 | Ramirez | G06F 13/409 |
| | | | 710/303 |
| 2016/0064979 A1* | 3/2016 | Huang | H02J 7/0055 |
| | | | 320/114 |

* cited by examiner

CHARGING A PROVIDER/CONSUMER WITH A DEAD BATTERY VIA USB POWER DELIVERY

CROSS-REFERENCE TO RELATED APPLICATIONS

This continuation application claims priority to U.S. patent application Ser. No. 13/862,620, filed Apr. 15, 2013, which claims the benefit of and priority to the following provisional patent applications:

U.S. Patent Application Ser. No. 61/652,001, filed on May 25, 2012;

U.S. Patent Application Ser. No. 61/624,760, filed on Apr. 16, 2012;

U.S. Patent Application Ser. No. 61/624,779, filed on Apr. 16, 2012;

U.S. Patent Application Ser. No. 61/642,953, filed on May 4, 2012; and

U.S. Patent Application Ser. No. 61/660,476, filed on Jun. 15, 2012. Each of the above applications is hereby incorporated by reference for all purposes.

TECHNICAL FIELD

The invention relates generally to power delivery and, more particularly, to power delivery to charge a dead battery over a universal serial bus (USB).

BACKGROUND

Turning to FIG. 1, an example of a conventional USB system 100 can be seen. This system 100 is an example of a system that is compliant with the USB Battery Charging Specification, Revision 1.2 plus Errata, dated Oct. 12, 2011 (which is incorporated herein by reference for all purposes). In this example, there are two USB devices (e.g., notebook computers) that are coupled to one another through a cable. This cable includes a power bus and a data bus. The power bus generally comprises a power conductor or wire VBUS (which can also be referred to as the VBUS conductor), a shield conductor SH (which can function as a ground conductor or wire), while the data bus can generally comprise data lines D[1] to D[N]. In this arrangement, functional circuits 108-1 and 108-2 can communicate data with one another, and power can be delivered over the power conductor VBUS and shield conductor SH between power supplied 106-1 and 106-2 (with capacitors C1-1 and C1-2 being coupled between the conductors VBUS and SH). Typically, these USB devices (e.g., 102-1 and 102-2) can operate only as single-role devices so they operate as consumers (i.e., having the capability to sink power from the power conductor VBUS) or providers (i.e., having the capability to source power over the power conductor VBUS).

Whereas the BC1.2 device described in FIG. 1 communicates via the data lines to negotiate power provided, the USB Power Delivery specification defines signaling over the VBUS conductor to negotiate the power provided. In FIG. 5, the Controller 314 can transmit and receive signals over VBUS using frequency shift keying. As part of the functional circuit in the USB device 302 (See FIG. 5), there is a device policy manager and a policy engine (which can, for example be implemented as finite state machines) that can interact with one another, and an example of a source port policy engine state diagram can be seen in FIG. 2A, FIG. 2B and FIG. 2C. At startup (in state 202), an initial starting state either on power up or after a Hard Reset (e.g., state 222) is set. On entry to this state 202, the policy engine resets the Protocol Layer and reset the CapsCounter (which is an counter used to count the number of Capabilities messages that convey a port's capabilities to source power including Dual-Role ports presently operating as a sink). Once the reset has completed the policy engine can transition to the Send Capabilities state 206.

On entry to the Discovery state 204 the policy engine performs the following tasks:

Initialize and run the SourceCapabilityTimer in order to trigger sending Capabilities If the SourceCapabilityTimer expires, no request is received from the partner device and the CapsCounter exceeds a maximum value nCapsCount, the policy engine can either enter the Disabled state 218 or the Hard Reset state 222.

Following the Startup state 202, the policy engine can enter the send capabilities state 206. In particular, a capabilities change event from the device policy manager while in any state can trigger the policy engine to enter the Send Capabilities state 206. There are also transitions from the Soft Reset state (not shown) and Protocol Error state (not shown). On entry to the Send Capabilities state 206, the policy engine can request the present port capabilities from the device policy manager. The policy engine can then request the Protocol Layer to send a Capabilities message containing these capabilities and can initialize and run the SenderResponseTimer (which ensures that a message requesting a response is responded to within a bounded time) and increment the CapsCounter (if implemented). If a GoodCRC message (i.e., acknowledgement that the previous message was correctly received) is received then the policy engine stops the NoResponseTimer and resets the HardResetCounter to zero. It should also be noted that the HardResetCounter is reset to zero in this state and at power up; its value can be maintained during a Hard Reset. The policy engine can then transition to the Negotiate Capability state 208 when a Request message (i.e., a message requesting power) is received from an attached Sink Port. The policy engine can also transition to the Discovery state 204 when the Protocol Layer indicates that the message has not been sent and we are presently unattached. This is part of the Capabilities sending process whereby successful message sending indicates attachment to a Sink Port. The policy engine can also transition to the Ready state when the SenderResponseTimer times out and the current power being used is still within the Source's present capabilities. No response from the Sink indicates it is content to continue to use the present power. The policy engine can also transition to the Hard Reset state 222 when the SenderResponseTimer times out and the present power being used is outside the Source's present capabilities. In this case a transition back to default power is required. When the NoResponseTimer times out and the HardResetCounter is greater than its maximum value (i.e., nHardResetCount), the policy engine can do one of the following:

Transition to the Discovery state 204.

Transition to the Disabled state 218.

It should be noted, too, that in either case the attached device is assumed to be unresponsive. The policy engine should operate as if the device is unattached until such time as a detach/reattach is detected.

Following the Send Capabilities state 206 and on entry to the Negotiate Capability state 208, the policy engine can ask the device policy manager to evaluate the Request from the attached Sink. The response from the device policy manager can be one of the following:

The Request can be met;

The Request cannot be met; or

The Request could be met later from the reserve.

The policy engine can transition to the Transition Supply state 210 when the Request can be met. The policy engine can transition to the Capability Response state 224 when the Request cannot be met or the Request can be met later from the reserve.

Following the Negotiate Capabilities state 208, the policy engine can be in the Transition Supply state 210 while the power supply is transitioning from one power to another. On entry to the Transition Supply state 210, the policy engine can initialize and run the SourceActivityTimer (i.e., timer used to maintain a minimum level of bus traffic), request the Protocol Layer to either send a GotoMin message (i.e., temporarily reallocate power to meet a short term requirement) if this was requested by the device policy manager or otherwise an Accept message and inform the device policy manager that it can transition the power supply to the Requested value of power. It should also be noted that if the power supply is currently operating at the requested power no change will be necessary. On exit from the Transition Supply state 210, the policy engine can request the Protocol Layer to send a PS_RDY message (i.e., indicates its power supply has reached the desired operating condition). The policy engine can transition to the Ready state 212 when the device policy manager informs the policy engine that the power supply is ready.

In the Ready state 212, the Source can operate at a stable power with no ongoing negotiation. It can respond to requests from the Sink, events from the device policy manager and can send out Ping messages (i.e., periodic message in the Ready state 212 when no other power negotiation or other messaging is taking place) to maintain the link. On entry to the Ready state 212, the policy engine can initialize and run the SourceActivityTimer. The policy engine can transition to the Transition supply state 210 when a GoToMin request is received from the device policy manager for the attached device to go to minimum power. The policy engine can transition to the Give Source Cap state 214 when a Get_Source_Cap message (i.e., request the Source Capabilities and Dual-Role capability) is received from the Sink. The policy engine can transition to the Get Sink Cap state 216 when the device policy manager asks for the Sink's capabilities. In the Disabled state 218, the Source supplies default power and is unresponsive to USB Power Delivery messaging. In order for the Source to transition to USB Power Delivery operation, a Hard Reset or some other form of reset is required. On entry to the Give Source Cap state 214 the policy engine can request the device policy manager for the current system capabilities. The policy engine can then request the Protocol Layer to send a Capabilities message containing these capabilities. The policy engine can transition to the Ready state 212 when the Capabilities message has been successfully sent. In the Get Sink Cap state 216, the policy engine, due to a request from the device policy manager, can request the Sink's capabilities from the attached Sink. On entry to the Get Sink Cap state 216 the policy engine can request the Protocol Layer to send a Get_Sink_Cap message in order to retrieve the Sink's capabilities. The policy engine can then start the SenderResponseTimer. On exit from the Get Sink Cap state 216 the policy engine can inform the device policy manager of the outcome (capabilities, response timeout or reject). The policy engine can transition to the Ready state 212 when a Sink Capabilities message is received or SenderResponseTimer times out.

The policy engine can enter the Capability Response state 224 if there is a Request received from the Sink that cannot be met based on the present capabilities. On entry to the Capability Response state 224 the policy engine can request the Protocol Layer to send one of the following:

Reject message—if the request cannot be met

Wait message—if the request could be met later from the reserve.

The policy engine can transition to the Ready state 212 when the Reject message or Wait message has been sent and the present value of power is still valid. The policy engine can transition to the Hard Reset state 222 when the Reject message or Wait message has been sent and the present value of power is not valid (i.e. the Sink had to request a new value so instead we will return to default operation).

The policy engine can transition from any state to the Hard Reset state 222 when the NoResponseTimer times out and the value the HardResetCounter is less than or equal to its maximum value (i.e., nHardResetCount) or the device policy manager requests a Hard Reset. On entry to the Hard Reset state 222 the policy engine can request the generation of Hard Reset signaling by the physical layer transceiver or PHY, initialize and run the NoResponseTimer and increment the HardResetCounter. It should also be noted that the NoResponseTimer can continue to run in every state until it is stopped or times out. The policy engine can transition to the Transition to default state 220 when the Hard Reset is complete.

The policy engine can transition from any state to the Transition to default state 220 when a Hard Reset signaling is detected. On entry to the Transition to default state 220, the policy engine can indicate to the device policy manager that the power supply can transition to default (e.g., 5V). The policy engine can then request a reset of the local hardware. The policy engine can transition to the Startup state 202 when the device policy manager indicates that the power supply has reached the default level.

In addition to the states shown in FIG. 2A, FIG. 2B and FIG. 2C, the policy engine can also implement dead battery protocols. In FIG. 3, the state diagram for consumer/provider behavior for dead battery detection is shown. In FIG. 4, the state diagram for provider/consumer behavior for dead battery detection is shown.

Turning first to FIG. 3, the consumer/provider can transition from a consumer to a provider role. The consumer/provider begins operating as a consumer from state 206 of FIG. 3, requesting a Protocol Layer reset. On entering state 226, the value on the power conductor VBUS is determined. In this state the power on conductor VBUS may be zero or the default value and the power delivery status (i.e., whether there is a power delivery partner at the far end) is unknown. If the default value is present on the power conductor VBUS, the consumer/provider continues to operate as a consumer (i.e., sink port) and transitions to the wait for capabilities state 224. However, if the power conductor VBUS is not present (which typically means that the voltage on power conductor VBUS is about 0V). Power is provided to the power conductor VBUS in state 228. In this state 228, the policy engine instructs the device policy manager to apply a voltage vPDDeadBattery to the power conductor VBUS, where the voltage vPDDeadBattery is a default voltage in the range between about 3.75V and about 4.6V. The consumer/provider then waits for a preamble from its partner in state 230. The preamble indication is typically received by a physical transceiver or PHY. When the preamble is detected by the PHY of the consumer/provider, it transitions to the Transition to Default state 220 so as to operate as a provider or source port (which can allow for battery charging from the source port to the sink port).

In FIG. 4, the provider/consumer can transition from a provider to a consumer role. This begins from state 238 when the voltage vPDDeadBattery is applied to the power conductor VBUS. When this is accomplished, the provider/consumer checks its power in state 240 and decides whether it is willing and/or able to provide power. If it is willing to provide power, it moves to the "transition to default" state (state 220) as a source port (i.e., provider). Otherwise, the provider/consumer can indicate that it wants to be powered in state 242 by sending a preamble. When a default voltage is present on the power conductor VBUS, the provider/consumer enters state 224 to wait for capabilities as a consumer (i.e., sink port).

There are, however, some drawbacks with these dead battery procedures. Namely, using these protocols (as illustrated in FIGS. 3 and 4), the provider/consumer can assume the role as a sink port before a consumer/provider (which operates as the partner for the provider/consumer) is aware that it should assume the role as a source port. As a result, the role swap (i.e., from consumer or sink port to provider or source port) may not be achieved at all due to an error. The cause of this error is that the provider/consumer transitions to a sink port after it detects about 4.75V on the power conductor VBUS, but, because the back-powered voltage (vPDDeadBattery) may be as large as 4.6V, the provider/consumer could easily be mistaken while trying to distinguish between 4.6V and 4.75V. Additionally, there is some difficulty in accurately measuring voltages on the power conductor VBUS.

Therefore, there is a need for an improved dead battery protocol for use with the USB PD standard.

SUMMARY

In accordance with the present invention, an apparatus that is configured to operate as a consumer/provider is provided. The apparatus comprises an interface having a power bus and a data bus, wherein the interface is configured to be coupled to a cable, and wherein the power bus includes a VBUS conductor and a ground conductor; an inductor that is coupled to the VBUS conductor; a power system that is configured to be coupled to a power source and that is coupled to the inductor; a power transceiver that is coupled to the power system and the VBUS conductor, wherein the power transceiver has a device policy manager and a policy engine, wherein the policy engine is configured to interact with the device policy manager, wherein the power transceiver is configured to: check the VBUS conductor to determine whether the voltage on the VBUS conductor is greater than a vSafe0V voltage within a dead battery detect time interval; instruct the device policy manager to apply a vSafeDB voltage to the VBUS conductor if the voltage on the VBUS conductor is not greater than the vSafe0V voltage; wait for a bit stream to be detected within a bit stream detect time interval; instruct the device policy manager to apply the vSafe0V voltage to the VBUS conductor if the bit stream is not detected within the bit stream detect timer interval; and instruct the device policy manager to apply a vSafe5V voltage to the VBUS conductor if the bit stream is detected; and send capabilities as a source port after the bit stream has stopped; and a capacitor that is coupled between the power transceiver and the VBUS conductor.

In accordance with the present invention, the power transceiver is configured to wait for capabilities from the attached source port device (or source port capabilities) if the voltage on the VBUS conductor is greater than the vSafe0V voltage.

In accordance with the present invention, the power transceiver is configured to instruct the device policy manager to apply the vSafe0V voltage to the VBUS conductor if the device ready timer interval lapses.

In accordance with the present invention, the power system further comprises a power converter that is coupled to a battery.

In accordance with the present invention, the power transceiver further comprises a controller that is coupled to the VBUS conductor.

In accordance with the present invention, the controller further comprises: the device policy manager; the policy engine that is configured to communicate with the device policy manager; a transmitter that is configured to communicate with the policy engine; a receiver that is configured to communicate with the policy engine; an interface that is configured to communicate with the transmitter and the receiver and that is coupled to the VBUS conductor.

In accordance with the present invention, the power transceiver further comprises a processing circuit that is configured to communicate with the device policy manager.

In accordance with the present invention, the power system further comprises a switching circuit that is coupled between the power converter and the inductor.

In accordance with the present invention, the power transceiver further comprises a state machine that is coupled to the controller.

In accordance with the present invention, the bit stream is detected after a plurality of consecutive bits match the alternating 0 and 1 pattern.

In accordance with the present invention, the power transceiver is configured to: wait for the bit stream to stop within a device ready timer interval; and send capabilities as the source port if the bit stream has stopped within the device ready timer interval.

In accordance with the present invention, the plurality of consecutive bit matches is 150 or 128.

In accordance with the present invention, an apparatus that is configured to operate as a provider/consumer is provided. The apparatus comprises an interface having a power bus and a data bus, wherein the interface is configured to be coupled to a cable, and wherein the power bus includes a VBUS conductor and a ground conductor; an inductor that is coupled to the VBUS conductor; a power system that is configured to be coupled to a battery and that is coupled to the inductor; a power transceiver that is coupled to the power system and the VBUS conductor, wherein the power transceiver has a device policy manager and a policy engine, wherein the power transceiver is configured to: wait for a vSafeDB voltage in order to operate in dead battery detection mode when the vSafe0V voltage is present on the VBUS conductor and the apparatus is unable to operate; check for a desired power state when a vSafeDB voltage is on the VBUS conductor or when the apparatus is ready to provide power to the VBUS conductor; send a bit stream if the apparatus wants to be powered; run a dead battery timer while waiting for detection while the bit stream is being sent; request a stop of the bit stream; and wait for capabilities as a sink port; and a capacitor that is coupled between the power transceiver and the VBUS conductor.

In accordance with the present invention, a method executed by a consumer/provider that is coupled to a VBUS conductor, a ground conductor and a data bus is provided. The method comprises checking the VBUS conductor to determine whether the voltage on the VBUS conductor is greater than a vSafe0V voltage within a dead battery detect time interval; instructing the device policy manager to apply a vSafeDB voltage to the VBUS conductor if the voltage on the VBUS conductor is greater than the vSafe0V voltage; waiting for a bit stream to be detected within a bit stream detect timer interval; instructing the device policy manager to apply the vSafe0V voltage to the VBUS conductor if the bit stream is not detected within the bit stream detect timer interval; instructing the device policy manager to a vSafe5V voltage to the VBUS conductor if the bit stream is detected; waiting for the bit stream to stop within a device ready timer interval; and sending capabilities as a source port if the bit stream has stopped within the device ready timer interval.

In accordance with the present invention, the method further comprises: waiting for sink port capabilities if the voltage on the VBUS conductor is greater than the vSafe0V voltage; and performing the step of instructing when the dead battery time interval has lapsed and the voltage on the VBUS conductor is less than the vSafe0V voltage.

In accordance with the present invention, the method further comprises instructing the device policy manager to apply the vSafe0V voltage to the VBUS conductor if the device ready timer interval lapses.

In accordance with the present invention, a method executed by a provider/consumer that is coupled to a VBUS conductor, a ground conductor and a data bus is provided. The method comprises waiting for the vSafeDB voltage in order to operate in dead battery detection mode when the vSafe0V voltage is present on the VBUS conductor and the provider/consumer is unable to operate; checking for a desired power state if the vSafeDB voltage is on the VBUS conductor or if the provider/consumer is ready to provide power to the VBUS conductor; sending a bit stream if the apparatus wants to be powered; running a dead battery timer while waiting for detection while the bit stream is being sent; after an interval for the dead battery timer has lapsed, waiting for capabilities to be negotiated; requesting a stop of the bit stream; and waiting for capabilities as a sink port.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
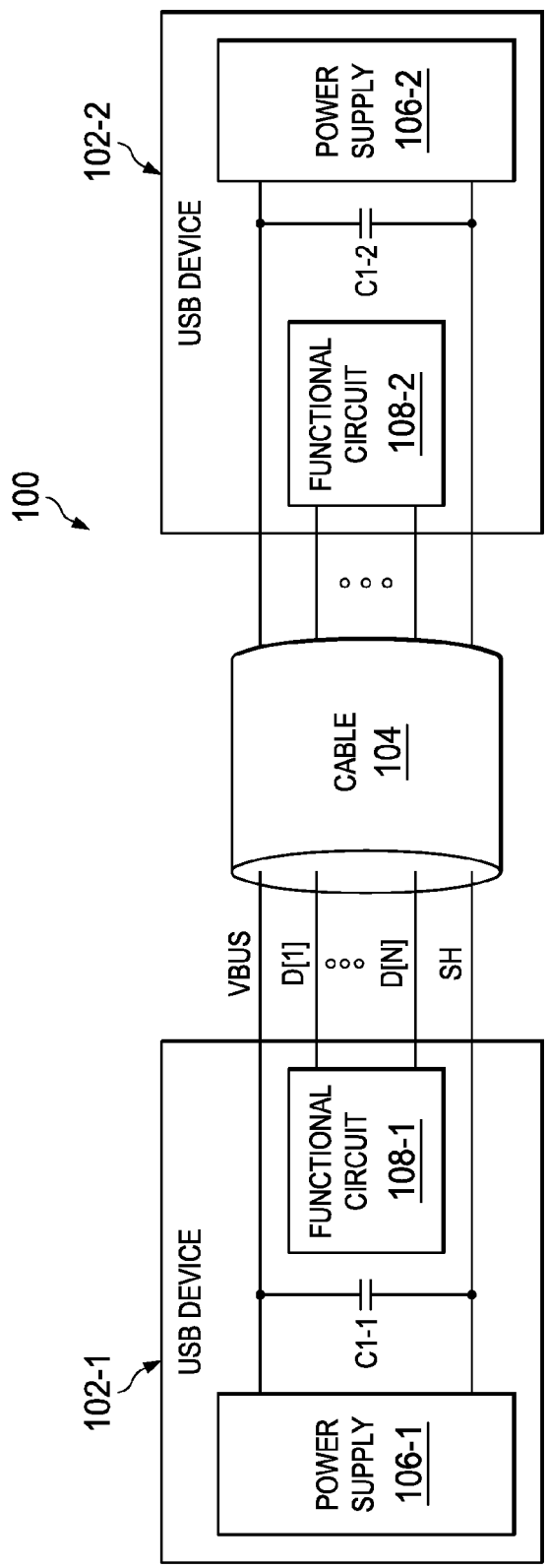
FIG. 1 is a diagram of an example of a conventional USB-compliant system.
Figure 2A:
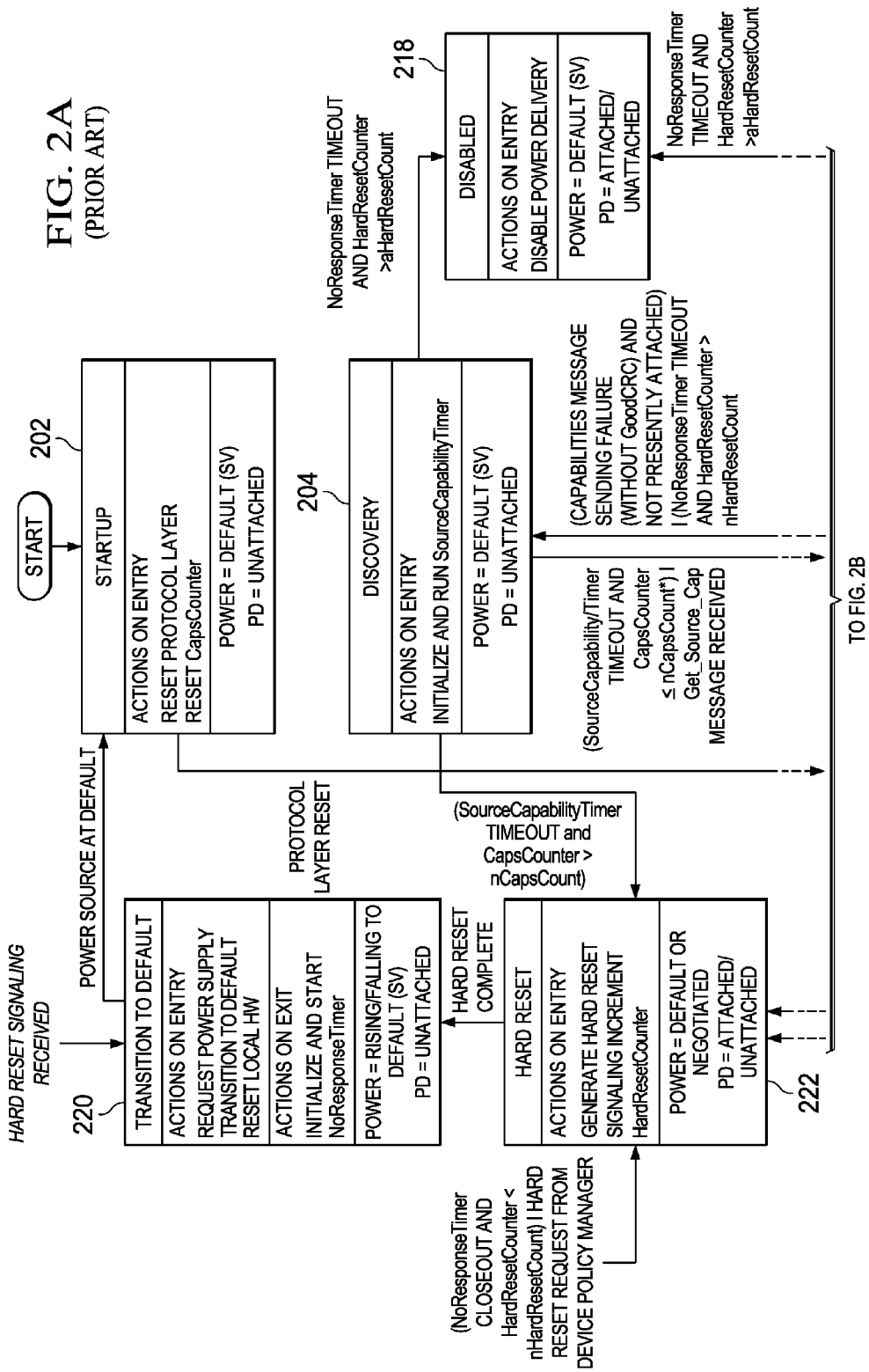
FIG. 2A is an example of a policy engine state diagram for the system of FIG. 5.
Figure 2B:
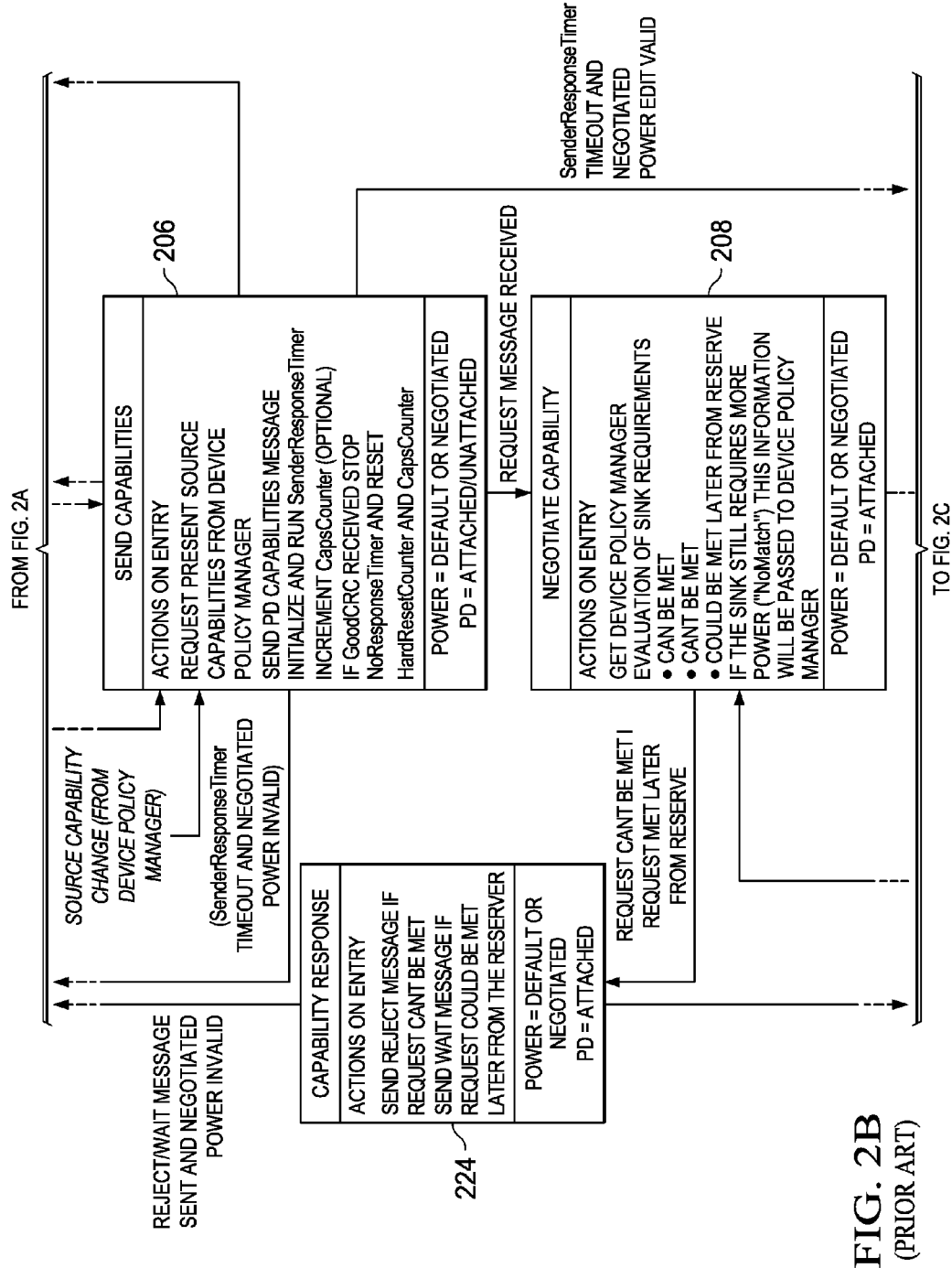
FIG. 2B is an example of a policy engine state diagram for the system of FIG. 5.
Figure 2C:
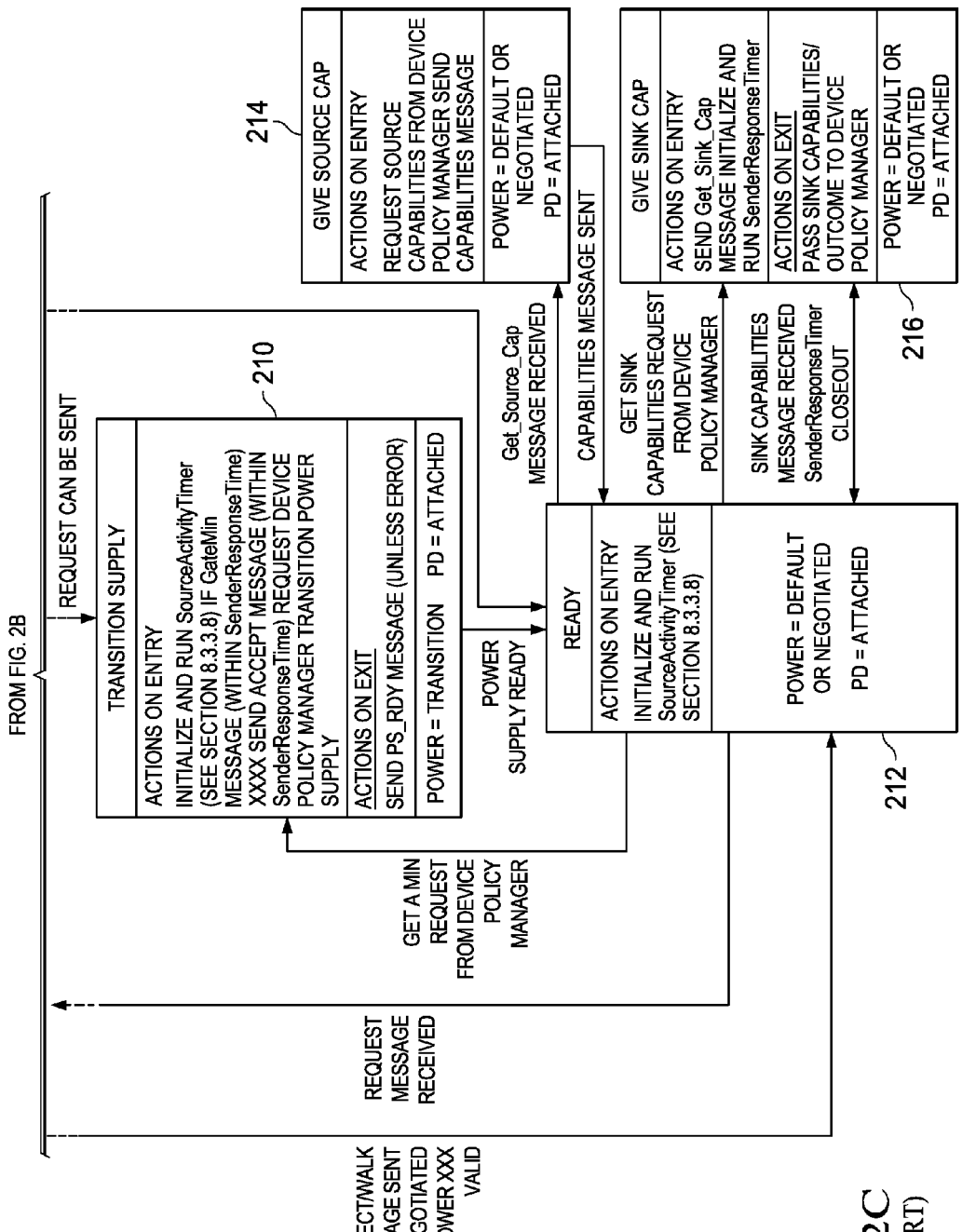
FIG. 2C is an example of a policy engine state diagram for the system of FIG. 5.
Figure 3:
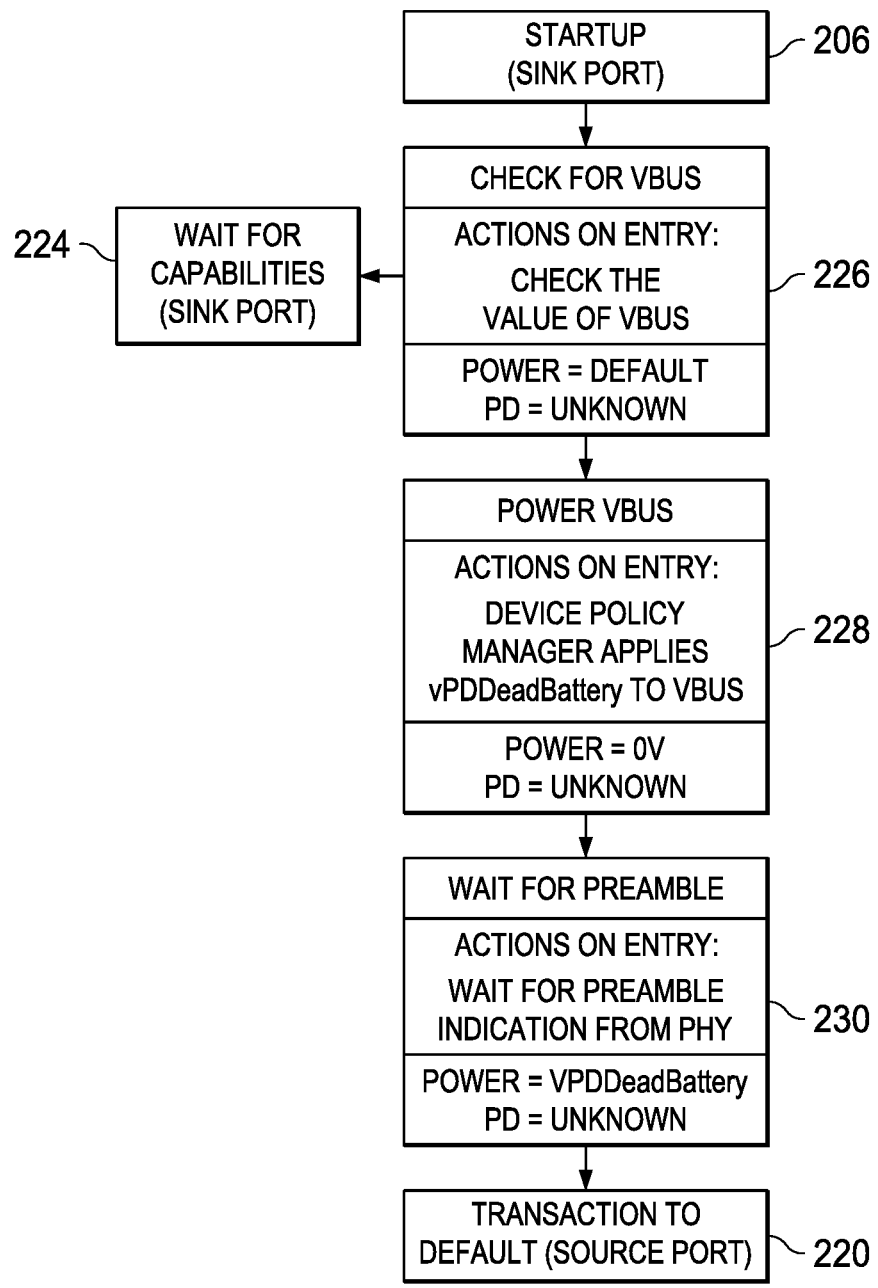
FIG. 3 is an example of a consumer/provider dead battery state diagram for the policy engine of FIGS. 2 and 3.
Figure 4:
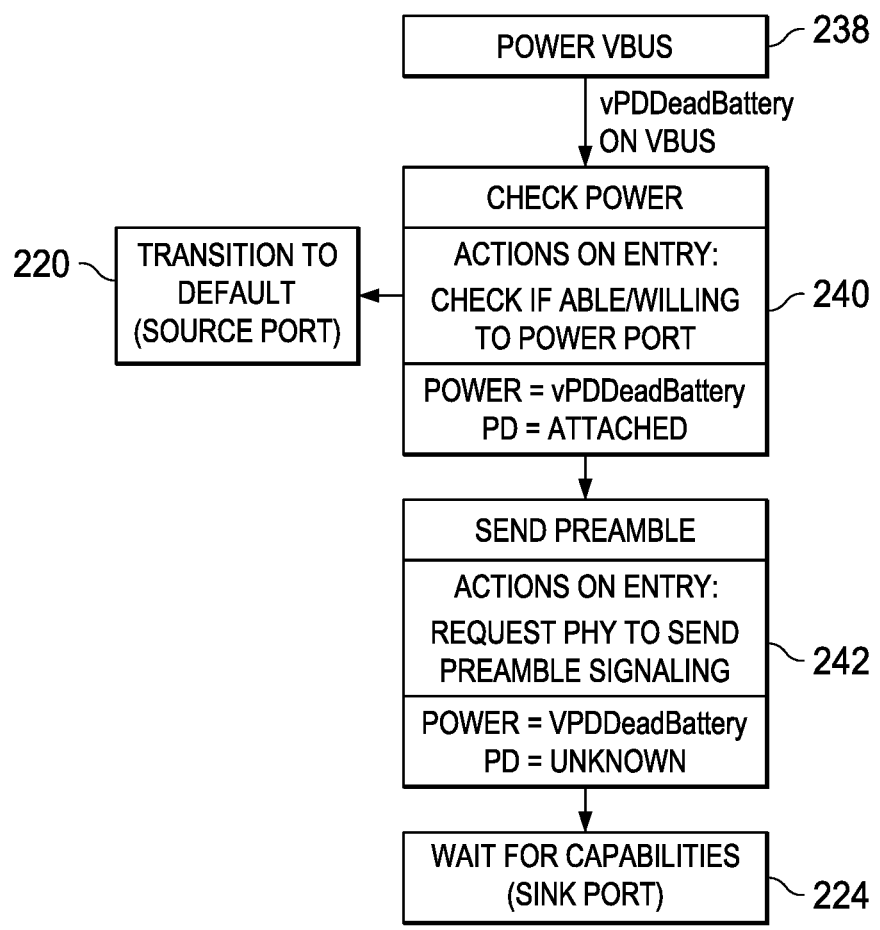
FIG. 4 is an example of a provider/consumer dead battery state diagram for the policy engine of FIGS. 2 and 3.

Refer now to the drawings wherein depicted elements are, for the sake of clarity, not necessarily shown to scale and wherein like or similar elements are designated by the same reference numeral through the several views.

Figure 5:
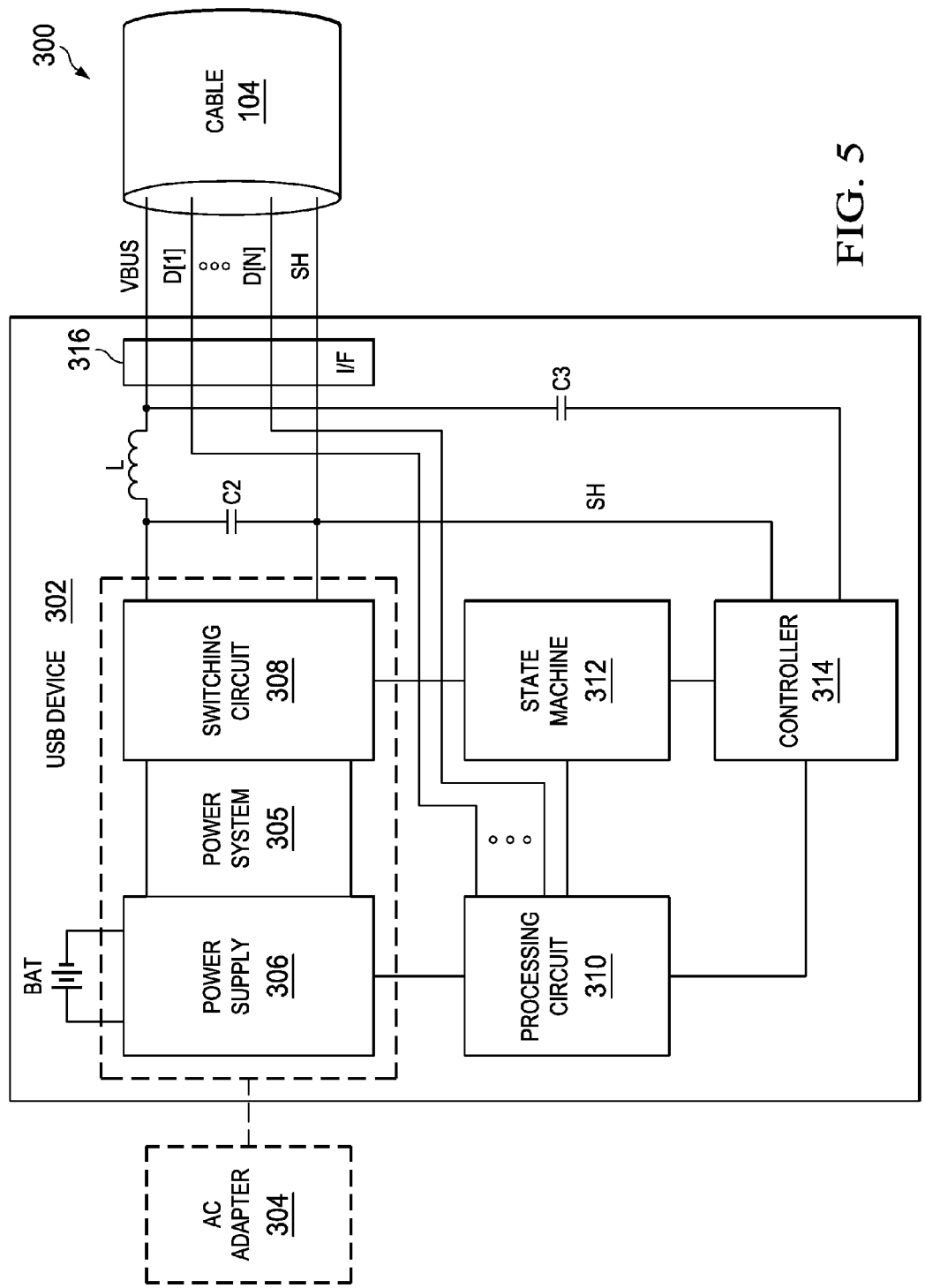
FIG. 5 is an example of a USB-PD compliant device.

Turning to FIG. 5, an example of a USB-PD-compliant device 302 can be seen. In this example, the device 302 is complaint with the USB 3.0 or USB 2.0 (including errata) dated Jun. 6, 2011 and the USB Power Delivery Specification, Revision 1.0, dated Mar. 25, 2013. Each specification is incorporated by reference herein for all purposes. As shown in this example implementation, the USB device 302 is coupled to a USB cable 104 through interface 316, and coupled to the VBUS conductor or power conductor VBUS is an inductor L. An inductor L is used in this example; however any isolation circuit such as an inductor and a capacitor in parallel may be used. A capacitor C2 may also be coupled between conductors VBUS and SH. The power system 305 (which can generally comprise a power supply, like a buck charger or power management integrated circuit, and switching circuit 308) can be capable of delivering (or sourcing) power as a provider or receiving (or sinking) power as a consumer over the cable 104. In this example, the switching circuit can allow the power supply 306 to provide or receive voltage at different ranges (e.g., about 5V and about 20V) over cable 104 or can be switches (e.g., bridge) used as part of buck and/or boost supply. The power supply 306 can be coupled to a battery or power cell BAT and may be coupled to an alternating current (AC) adapter 304. As part of the USB device 302, there is also a processing circuit 310, which can include functional components (such as the processor, memory, and user interface of a notebook or tablet computer) as well as processing circuitry used to implement power delivery aspects of the USB PD standard. This processing circuitry 310 can communicate with the data bus D[1] to D[N] (which can be both conductors or optical fibers) and can communicate with the state machine 312 and controller 314. The state machine 312 can be used to control the switches 308 and may be optionally included, while the controller 314 can be used to implement power delivery aspects of the USB PD standard. The components of the USB device 302 may also be implemented on one or more integrated circuits (IC) or chips. Alternatively, the AC adaptor 304 may be coupled to the switching circuit 308 so that the State Machine 312 controls if the AC adaptor 304 input or the VBUS conductor is the source of power for the power supply 306 input.

Figure 6:
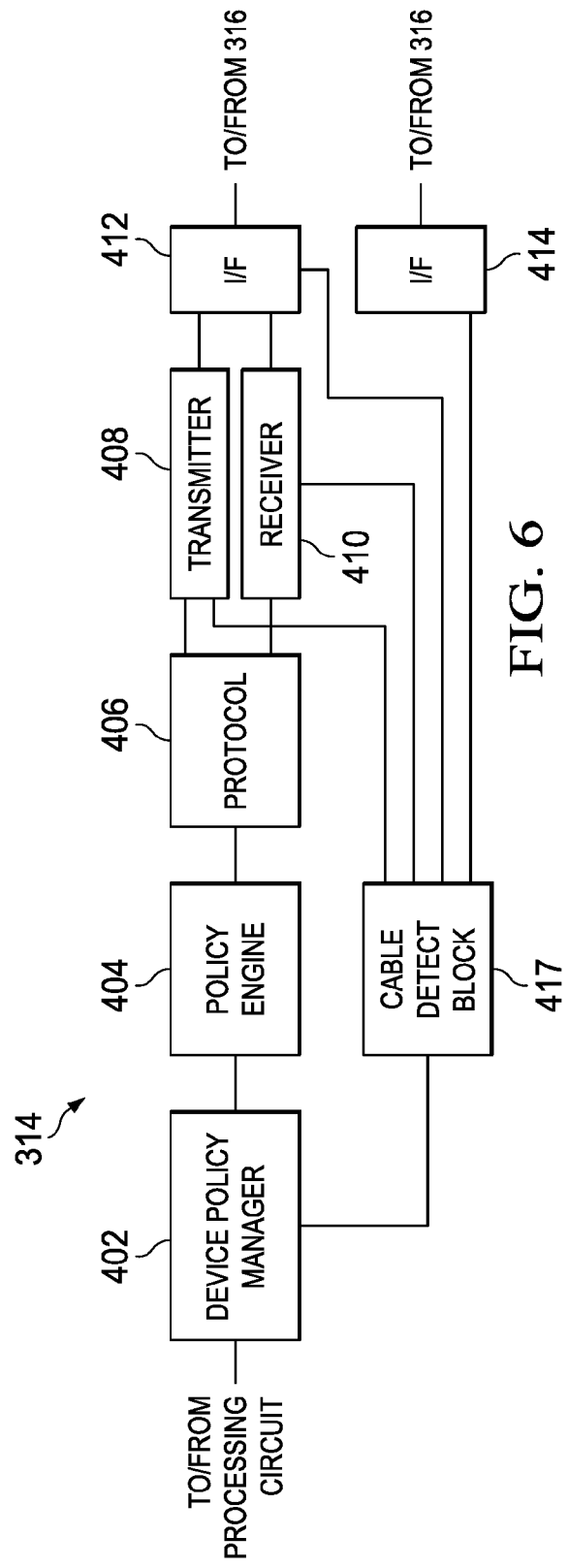
FIG. 6 is an example of the controller of FIG. 5.

In FIG. 6, the controller 314 can be seen in greater detail. This controller 314 can function as a power transceiver, and, in this controller 314, there is a policy device manager 402, policy engine 404, and protocol layer 406 that are capable of communicating with one another, where each is described in USB Power Delivery Specification, Revision 1.0, dated Mar. 25, 2013. Typically, policy device manager 402, policy engine 404, and protocol layer 406 are implemented as state machines, but each can be implemented as software implemented on a processor and non-transitory memory (e.g., flash memory, random access memory, etc.). The device policy manager 402 is able to communicate with the Cable Detect 417. The Cable Detect 417 communicates with the transmitter 408, receiver 410, I/F 412 and I/F 414. The transmitter 408 and receiver 410 are able to interact with the power conductor VBUS through I/F 412 and capacitor C3 (shown as being coupled between the controller 314 and the power conductor VBUS in FIG. 5). They may also interact with the ID pin that is included in some USB receptacle types (e.g. Standard-B, Micro-B, Micro-AB).

In order for the device policy manager 402 to make its decisions it needs access to the plug status of the receptacle. The plug status may include whether there is a plug attached, and if so what type of plug is attached. The operation of the cable detect block 417 depends upon the type of receptacle in the device. For a standard-A receptacle the cable detect block 417 may look at the INSRT pin in the plug which is grounded when a plug is inserted, and the PD detect pin which is grounded when a PD compliant plug is inserted. It can access these pins through the I/F block 414 for example. For other receptacle types, the cable detect block 417 may need to probe for a capacitor in the plug connecting the Vbus and ID pins. It may do this by configuring I/F 412 such that the receiver block 410 is receiving a signal from the ID pin, and the transmitter block 408 is transmitting a signal over the Vbus pin. If the capacitor is present, the receiver block 410 will see the signal. In some embodiments, a resistor is put in parallel with the ID pin so that parasitic capacitance between the Vbus and ID pins does not pass the transmitted signal.

In other cases, the cable detect block 417 may need to probe for a capacitor in the plug from the ID pin to the SH (or ground) pin. It may do so by configuring I/F 412 such that the receiver block 410 is connected to both the Vbus and ID pins. If the capacitor between the ID and SH pins in the plug is present, then the receiver block 410 will not receive the transmitted signal, but if the capacitor is not present it will receive the transmitted signal. For a micro-AB receptacle, the cable detect block 417 needs to estimate the value of the resistance between the ID and SH pins in the plug. In this case it may access the ID and SH pins through I/F 414. If the resistance is greater than approximately 1100 ohms, then there is not an A plug. If the resistance is between approximately 900 ohms and 1100 ohms, there is a PD compatible A plug inserted. If the resistance is smaller, approximately 10 ohms, then there is a legacy A plug inserted. Therefore, the cable detect block 417 can provide detailed information about the status of the presence of a plug in the receptacle as well as the cable type to the Device Policy Manager 402. Alternatively, the configuration of I/F 412 used to probe for the capacitance from the ID pin to the SH pin could be reused and the receiver can estimate the resistance from the ID pin to ground based upon the amplitude of the received signal.

Figure 7:
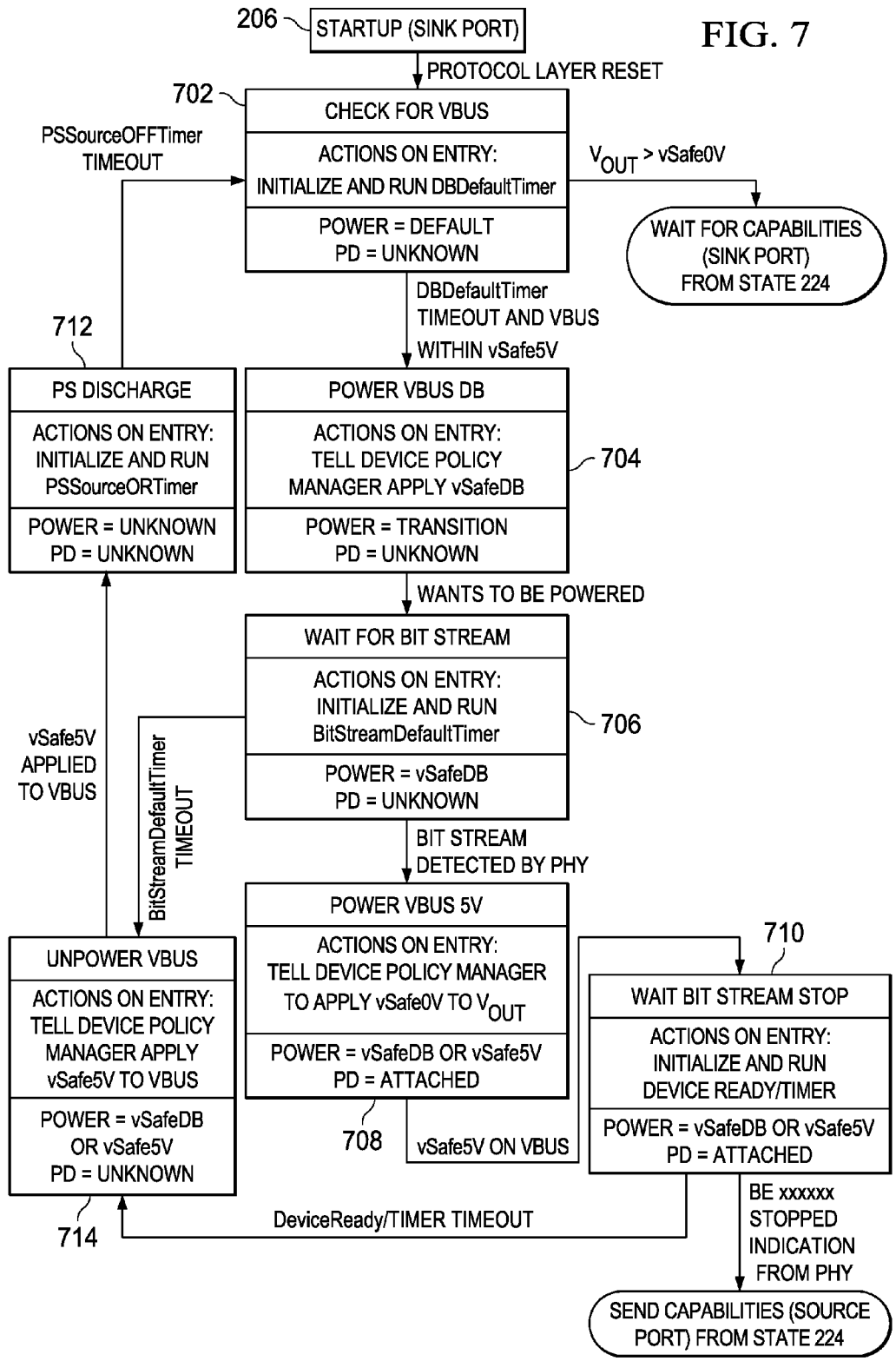
FIG. 7 is an example of a consumer/provider dead battery state diagram for the policy engine of FIGS. 5 and 6.

For a dead battery or power loss with a USB device 302 operating as a consumer/provider, an example of a state diagram as implanted by the policy engine 404 can be seen in FIG. 7. After the policy engine 404 has transitioned to the Send Capabilities state 206, the protocol layer 406 is reset. On entry to the Check for VBUS state 702, the policy engine 404 initializes and runs the dead battery detect timer or timer DBDetectTimer (which generally has a maximum value tDBDetect that can be less than 15 s). It may also stop the NoResponseTimer. While the dead battery detect timer is running, the policy engine 404 examines the voltage on the power conductor VBUS. If the voltage on the power conductor VBUS is greater than the vSafe0V voltage (which is a safe operating voltage at 0V and is typically between 0V and 0.5V), then the policy engine 404 transitions to the Wait for Capabilities state 224 as a sink port (or consumer). However, when the dead batter detect timer has timed out or reached its maximum (i.e., tDBDetect) and the voltage on power conductor VBUS is within (e.g., less than or equal to) the vSafe0V voltage, then the policy engine 404 transitions to the Power VBUS DB state 704. Upon entry into state 704, the policy engine 404 instructs the device policy manager 402 to apply the vSafeDB (which is the safe operating voltage for dual-role portions operating as a dead battery source and which can range from about 0V to about 5.25V that is current limited between 0 mA and 90 mA) to the power conductor VBUS. By providing this vSafeDB voltage to the power conductor VBUS, the power transceiver (e.g., controller 314) of the partnering USB device can receive enough power to respond.

Following state 704, the USB device 302 operating as consumer/provider can communicate with its partnering device (which is presumably a USB device 302 operating as a provider/consumer). On entry into the Wait for Bit Stream state 706, the policy engine 404 can initialize and run the timer BitStreamDetectTimer (which can have a maximum value tBitStreamDetect that can be about 0.3 s). While the timer BitStreamDetectTimer is running, the USB device 302 operating as consumer/provider waits to receive a bit stream that substantially matches a preamble pattern. For example, the USB device 302 operating consumer/provider can wait to receive 150 or 128 consecutive symbols (e.g., bits) that match the preamble pattern. If the bit pattern (e.g. 150 or 128 consecutive symbols that match the preamble pattern) are detected by the physical transceiver or PHY (which can generally be comprised of transmitter 408, receiver 410, I/F 412, and capacitor C3), the policy engine 404, in state 708, instructs the device policy manager 402 to apply a vSafe5V voltage (which is generally the safe operating voltage at 5V and can generally be between about 4.75V and about 5.25V) to the power conductor VBUS and transitions to state 710. On entry to state 710, the policy engine 404 initializes and runs timer DeviceReadyTimer (which can have a maximum value tDeviceReady that can range from about 60 s to about 90 s). If the physical transceiver or PHY indicates that the bit stream has stopped within the interval set by the timer DeviceReadyTimer, then the policy engine 404 enters the Send Capabilities state 224 as a source port so as to swap roles from a consumer to a provider.

There are also cases where the power conductor VBUS may be unpowered (i.e., state 714). This can occur when the timer BitStreamDetectTimer times out or reaches its maximum value tBitStreamDetect in state 706 or when the timer DeviceReadyTimer times out or reaches its maximum value tDeviceReady. On entering state 714, the policy engine 404 instructs the device policy manager 402 to apply the vSafe0V voltage to the power conductor VBUS. Then, the policy engine 404 can enter state 712. On entering state 712, the policy engine initializes and runs the power supply source timer or PSSourceOffTimer. Once the timer PSSourceOffTimer has timed out or reached its maximum value tPSSourceOff (which can, for example, be between about 200 ms and 220 ms), the policy engine 404 returns to state 702.

Figure 8:
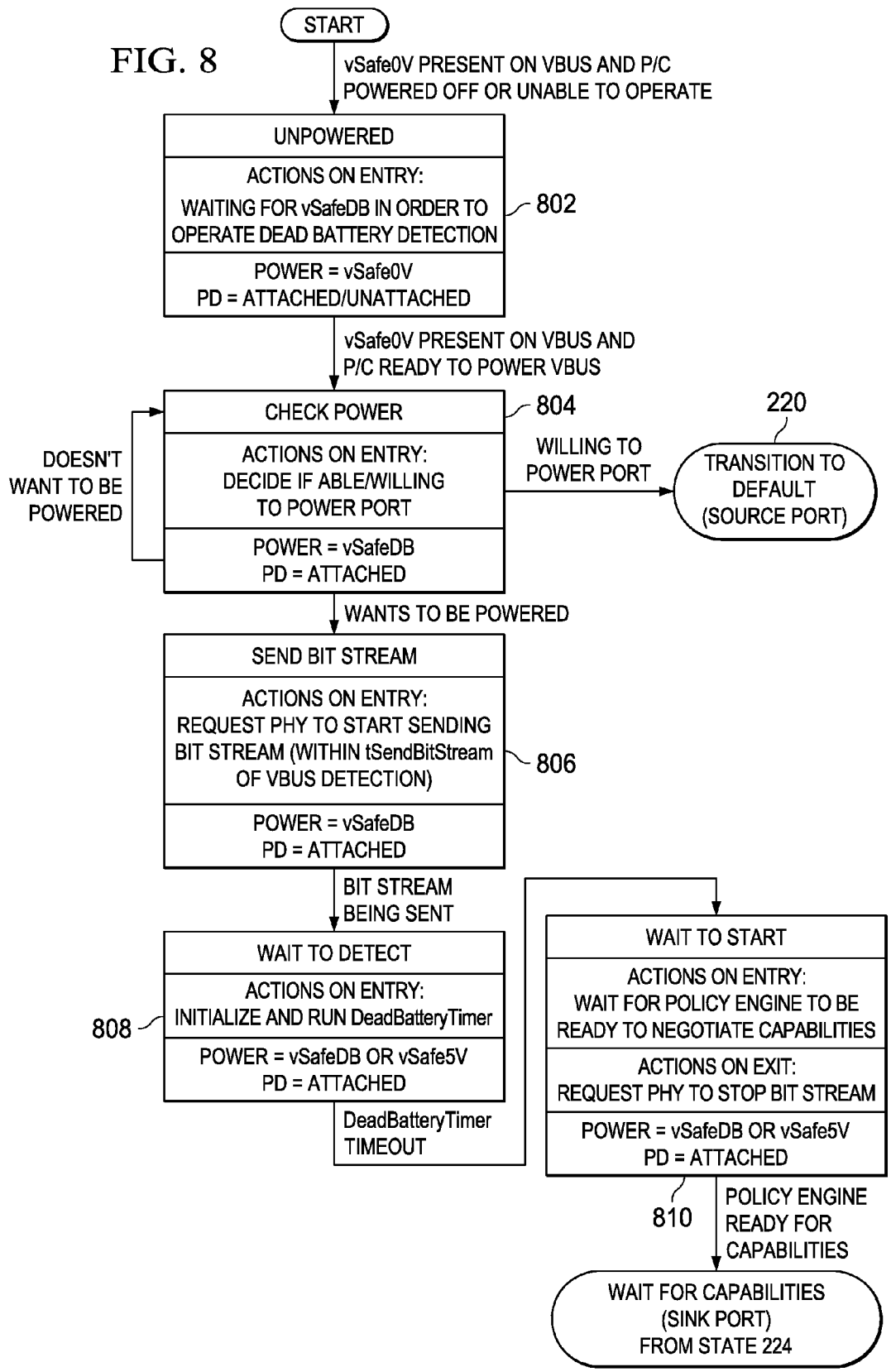
FIG. 8 is an example of a provider/consumer dead battery state diagram for the policy engine of FIGS. 5 and 6.

For a dead battery or power loss with a USB device 302 operating as a provider/consumer, an example of a state diagram as implanted by the policy engine 404 can be seen in FIG. 8. With this condition, the USB device 302 operating as a provider/consumer can be assumed to start where it is either powered off or is unable to power its port (e.g., due to a dead battery). If the State Machine 312 and Controller 314 operating as a provider/consumer are powered on and have sufficient power to power its port it should start up as a source port or provider. When the voltage vSafe0V is present on the power conductor VBUS and the USB device 302 operating as a provider/consumer is unwilling or unable to operate, the policy engine enters state 802. In state 802 (which is an unpowered state), the policy engine 404 waits for the voltage vSafeDB to be supplied on the power conductor VBUS. Once the voltage vSafeDB is present on power conductor VBUS or when the USB device 302 operating as a provider/consumer is ready to power to the power conductor VBUS, the policy engine 404 transitions to state 804, where the power is checked. On entry to state 804, the USB device 302 operating as a provider/consumer determines whether it is able or willing to provide power, remaining in state 804 if it is unwilling to be powered but transitioning to state 220, as a source port or provider, if it is willing to supply power. Under the circumstances where the USB device 302 operating as a provider/consumer desires to be powered, it transitions to state 806, where it requests the physical transceiver PHY to begin sending a bit stream within an interval having a length or maximum value tSendBitStream. After or while transmitting the bit stream, it waits for detection in state 808. In state 808, the USB device 302 operating as a provider/consumer initializes and run the timer DeadBatteryTimer, and, once the timer DeadBatteryTimer times out or reaches its maximum value, the policy engine 404 transitions to state 810. On entering state 810, the USB device 302 operating as a provider/consumer waits for the policy engine 404 to be ready to receive and process capabilities (i.e., state 206) from the partner device and once ready, the policy engine 404 requests that the physical transceiver PHY stop the bit stream as it exits state 810. The policy engine 404 then enters state 224 as a sink port or a consumer.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus that is configured to operate as a consumer/provider, the apparatus comprising:
    an interface having a power bus and a data bus, wherein the interface is configured to be coupled to a cable, and wherein the power bus includes a VBUS conductor and a ground conductor;
    an inductor that is coupled to the VBUS conductor;
    a power system that is configured to be coupled to a power source and that is coupled to the inductor;
    a power transceiver that is coupled to the power system and the VBUS conductor, wherein the power transceiver has a device policy manager and a policy engine, wherein the policy engine is configured to interact with the device policy manager, wherein the power transceiver is configured to:
        check the VBUS conductor to determine whether the voltage on the VBUS conductor is greater than a vSafe0V voltage within a dead battery detect time interval;
        instruct the device policy manager to apply a vSafeDB voltage to the VBUS conductor if the voltage on the VBUS conductor is not greater than the vSafe0V voltage;
        wait for a bit stream to be detected within a bit stream detect time interval;
        instruct the device policy manager to apply the vSafe0V voltage to the VBUS conductor if the bit stream is not detected within the bit stream detect timer interval; and
        instruct the device policy manager to apply a vSafe5V voltage to the VBUS conductor if the bit stream is detected; and
        send capabilities as a source port after the bit stream has stopped; and
    a capacitor that is coupled between the power transceiver and the VBUS conductor.

2. The apparatus of claim 1, wherein the power transceiver is configured to wait for source port capabilities if the voltage on the VBUS conductor is greater than the vSafe0V voltage.

3. The apparatus of claim 2, wherein the power transceiver is configured to instruct the device policy manager to apply the vSafe0V voltage to the VBUS conductor if the device ready timer interval lapses.

4. The apparatus of claim 3, wherein the power transceiver further comprises a controller that is coupled to the VBUS conductor.

5. The apparatus of claim 4, wherein the controller further comprises:
    the device policy manager;
    the policy engine that is configured to communicate with the device policy manager;
    a transmitter that is configured to communicate with the policy engine;
    a receiver that is configured to communicate with the policy engine;
    an interface that is configured to communicate with the transmitter and the receiver and that is coupled to the VBUS conductor.

6. The apparatus of claim 5, wherein the power system further comprises a switching circuit that is coupled between the power converter and the inductor.

7. The apparatus of claim 6, wherein the power transceiver further comprises a state machine that is coupled to the controller.

8. The apparatus of claim 7, wherein the bit stream is detected after a plurality of consecutive bits match an alternating 0 and 1 pattern.

* * * * *